United States Patent
Barre et al.

(10) Patent No.: US 8,256,713 B2
(45) Date of Patent: Sep. 4, 2012

(54) AIRCRAFT FUSELAGE SECTION

(75) Inventors: Marie Ange Barre, Plaisance du Touch (FR); Didier De Villele, Launac (FR); Thierry Duperou, Frouzins (FR); Christian Godenzi, Colomiers (FR); Mathieu Tesson, Toulouse (FR); Anne Laure Vedel, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 314 days.

(21) Appl. No.: 12/634,311

(22) Filed: Dec. 9, 2009

(65) Prior Publication Data

US 2010/0140403 A1 Jun. 10, 2010

(30) Foreign Application Priority Data

Dec. 9, 2008 (FR) ..................................... 08 58417

(51) Int. Cl.
*B64C 1/00* (2006.01)
(52) U.S. Cl. ...................... 244/119; 244/118.1; 244/120
(58) Field of Classification Search .................. 244/120, 244/119, 118.1, 117 R, 131, 123.1, 123.7, 244/124
See application file for complete search history.

(56) References Cited

U.S. PATENT DOCUMENTS

| | | | |
|---|---|---|---|
| 2,416,245 A | | 2/1947 | Watter et al. |
| 3,361,401 A | * | 1/1968 | Hanifan ....................... 410/156 |
| 4,479,621 A | * | 10/1984 | Bergholz .................... 244/117 R |
| 5,301,914 A | * | 4/1994 | Yoshida et al. ............... 248/430 |
| 5,542,626 A | | 8/1996 | Beuck et al. |
| 6,170,157 B1 | * | 1/2001 | Munk et al. .................. 29/897.2 |
| 6,364,250 B1 | * | 4/2002 | Brinck et al. .................. 244/119 |
| 6,554,225 B1 | * | 4/2003 | Anast et al. ............... 244/117 R |
| 6,834,833 B2 | | 12/2004 | Sankrithi |
| 7,163,178 B2 | * | 1/2007 | Ricaud ........................ 244/118.1 |
| 7,407,134 B2 | | 8/2008 | Bietenhader |
| 7,775,478 B2 | | 8/2010 | Wood et al. |
| 7,891,608 B2 | * | 2/2011 | Rawdon et al. ............... 244/119 |
| 8,025,253 B2 | | 9/2011 | Sprenger |
| 2005/0230538 A1 | * | 10/2005 | Sarpy ........................ 244/117 R |
| 2006/0065773 A1 | * | 3/2006 | Grant ............................. 244/1 R |
| 2008/0078129 A1 | | 4/2008 | Wood et al. |
| 2008/0264936 A1 | * | 10/2008 | Godenzi ........................ 220/1.5 |
| 2008/0272236 A1 | * | 11/2008 | Rawdon et al. ............. 244/118.1 |

(Continued)

FOREIGN PATENT DOCUMENTS

DE 1060264 6/1959

(Continued)

OTHER PUBLICATIONS

International Search Report and Written Opinion for International Application No. PCT/EP2007/053419 dated May 30, 2007.

(Continued)

*Primary Examiner* — Christopher P Ellis
*Assistant Examiner* — Medhat Badawi
(74) *Attorney, Agent, or Firm* — Patterson Thuente Christensen Pedersen, P.A.

(57) ABSTRACT

The invention relates to an aircraft fuselage section comprising several longitudinal strengthening beams attached to the fuselage section lower panel and several longitudinal rails intended for supporting the floor boards, characterized by at least one crosspiece laid transversally between two strengthening beams and supporting one longitudinal rail, said crosspiece said crosspiece being mounted swiveling on the fuselage section lower panel in order to permit the rotation of the crosspiece around a longitudinal axis.

6 Claims, 3 Drawing Sheets

U.S. PATENT DOCUMENTS

| | | |
|---|---|---|
| 2008/0283665 A1* | 11/2008 | Rouyre .................. 244/119 |
| 2009/0026770 A1* | 1/2009 | Huntemann ............. 290/55 |
| 2009/0121082 A1* | 5/2009 | Godenzi et al. ......... 244/123.1 |
| 2009/0146007 A1* | 6/2009 | Keeler et al. ........... 244/119 |
| 2009/0173826 A1* | 7/2009 | Estell et al. ............. 244/131 |
| 2009/0230241 A1 | 9/2009 | Heller et al. |
| 2009/0236472 A1 | 9/2009 | Wood |
| 2009/0294587 A1 | 12/2009 | Ricaud et al. |
| 2009/0302157 A1 | 12/2009 | Ricaud |
| 2009/0324356 A1* | 12/2009 | Schulze et al. ......... 410/54 |
| 2010/0001129 A1 | 1/2010 | Guering |
| 2010/0012773 A1 | 1/2010 | Im |
| 2010/0032520 A1* | 2/2010 | Mauran et al. ......... 244/99.4 |
| 2010/0038024 A1* | 2/2010 | Brandt .................... 156/249 |
| 2010/0108808 A1 | 5/2010 | Allain et al. |
| 2010/0116932 A1 | 5/2010 | Helou, Jr. |
| 2010/0163669 A1 | 7/2010 | Im |
| 2010/0187352 A1 | 7/2010 | Yavilevich |
| 2011/0001006 A1 | 1/2011 | Delahaye et al. |
| 2011/0001008 A1 | 1/2011 | Delahaye et al. |
| 2011/0180657 A1* | 7/2011 | Gionta et al. .......... 244/49 |

FOREIGN PATENT DOCUMENTS

| | | |
|---|---|---|
| DE | 3141869 | 5/1983 |
| DE | 29713530 | 9/1997 |
| EP | 1 564 141 A1 | 8/2005 |
| EP | 1614625 | 1/2006 |
| FR | 2689851 | 10/1993 |
| FR | 2 900 125 A1 | 10/2007 |
| GB | 2196922 | 5/1988 |
| WO | WO2007/122096 | 11/2007 |

OTHER PUBLICATIONS

Application and File History for U.S. Appl. No. 12/297,604, filed Mar. 9, 2009.

* cited by examiner

AIRCRAFT FUSELAGE SECTION

RELATED APPLICATION

The present application claims priority to French Application No. 08 58417 filed Dec. 9, 2008, which is incorporated herein in its entirety by reference.

TECHNICAL FIELD

The invention relates to an aircraft fuselage section. More precisely, the invention relates to the floor of the aircraft located within the internal volume of the fuselage section, the purpose of which is to support cargo or passengers. The fuselage section according to the invention is specifically intended to form the center section of the fuselage in which the center wing box is located.

BACKGROUND OF THE INVENTION

The aircraft floor at the level of the center wing box is subjected to many stresses due to the distortion of the center wing box, particularly in flight. FIG. 1 shows a cross section of an aircraft fuselage 1 at the level of the center wing box while the aircraft is in flight. Compression and tension forces applied to the wings 2 tend to extend the lower surface 3 of the wings 2 and conversely, to shorten the upper surface 4 of the wings 2. Such a distortion of the wings 2 causes a similar distortion of the center wing box 5 and of the floor structure 6 above said wing box 5. In the case where the floor structure is rigidly tied to the upper surface 4 of the wings 2, these distortions can lead to cracks or to a weakening of the floor structure 6.

FIGS. 2 and 3 of the state of the art show a cross section of an aircraft floor structure at the level of the center wing box.

A floor structure 6 consists of a series of longitudinal beams 8 intended to strengthen the lower floor panel 7 of the fuselage section and is aligned with the upper surface 4 of the wings. Said longitudinal beams 8 are fastened to the lower or upper face of the said floor panel, the upper face being in the internal volume of the fuselage and the lower face being in the internal volume of the center wing box 5. The longitudinal beams 8 are also attached to a number of vertical connecting rods 13 placed between the longitudinal beams and the bottom panel 12 of the center wing box 5.

In addition, several longitudinal rails 9 are laid above the longitudinal beams 8. In that way, the several longitudinal beams 8 support the entire length one or several longitudinal rails 9, which are tied to them by vertical rods 10.

In some aircraft and in particular those that are designed for freight, the floor structure 6 includes also longitudinal rails 11 directly fastened to the lower floor panel 7 of the fuselage by vertical rods 10, and are therefore independent of strengthening longitudinal beams.

Thus on FIGS. 2 and 3 of the state of the art, the floor structure includes two central longitudinal rails 11, two left longitudinal rails 11 and two right longitudinal rails 11 which are independent from the longitudinal beams.

Yet, whereas the longitudinal rails 9 attached to the longitudinal beams 8 are able to follow the distortions of the lower floor panel 7 of the fuselage, the central and side longitudinal rails 11, directly fastened to the lower floor panel 7 of the fuselage by means of vertical rods 10, are rigidly tied to the said panel 7 and can not follow the floor distortions. Such a rigid link may lead to excessive stress causing cracks in the floor structure 6 at the center wing box 5 level.

The invention seeks to provide an aircraft floor, notably intended to be the floor of a fuselage section containing the center wing box, which can adapt to the distortions caused by the wings movement. To that effect, the invention proposes to disassociate the distortions of the general structure of the fuselage section and that of the floor itself, in order to lower the forces on the said floor. More precisely, the invention proposes to disassociate the work of the floor and that of the support surface on which the floor is attached.

In the fuselage section according to the invention, the floor is fitted with longitudinal rails linked to the floor support surface by means of longitudinal beams fixed on said support surface. Longitudinal in this description means parallel to the longitudinal axis of the aircraft. The support surface consists of a lower panel of the particular fuselage section, which may be in the case of the center section, the upper panel of the center wing box. The longitudinal rails, which in state of the art aircraft are not fixed on the longitudinal beams and are thus directly linked to the support surface, are henceforth attached to at least one transversal crosspiece that can expand or retract in order to follow the lengthening or shortening of the support surface. Transversal in this description means perpendicular to the longitudinal axis of the aircraft. The transversal crosspiece is linked to the support surface by means of swivel linkages allowing the crosspiece to follow the distortions of the support surface. For example, the crosspiece features two pivoting elements, the second being able to swivel relative to the first in order to transversally lengthen or shorten the largest dimension of said crosspiece. The crosspiece according to the invention is not subject to wing loads, but supports only vertical forces.

Therefore, the object of the invention is an aircraft fuselage section comprising several longitudinal strengthening beams attached to a lower panel of the fuselage and several longitudinal floor support rails, characterized by at least one crosspiece extending transversally between two strengthening beams and supporting a longitudinal rail, said crosspiece being able to swivel on the lower panel of the fuselage in such a way as to permit its rotation around a longitudinal axis.

The opposite ends of the crosspiece are each fixed to one of the two longitudinal beams between which the crosspiece is mounted.

Swivel in this description means that the crosspiece can pivot from one position to another by rotating around an axis parallel to the fuselage section longitudinal axis. Such a rotation of the crosspiece allows it to follow the transversal distortion of the lower panel of the fuselage section.

The crosspiece can be mounted to swivel directly on the fuselage section lower panel, or attached to one or both of the strengthening beams between which it is installed, these being fixed on the aircraft lower panel.

Some embodiments of the fuselage section according to the invention allow for all or part of the following characteristics:

The fuselage section, and more specifically the floor structure of said section, comprising several crosspieces extending successively between at least two strengthening beams, at least one longitudinal rail extending longitudinally between two strengthening beams and supported by a series of crosspieces. The longitudinal rail is thus supported along its entire length by crosspieces bound to the fuselage section lower panel. The crosspieces are placed one behind the other with respect to the longitudinal axis of the aircraft section.

at least one crosspiece features a double pivot articulation, the first pivot being attached to the main body of the crosspiece and the second pivot being attached to the fuselage section lower panel.

The presence of this articulation that can pivot from a position in line with the main body to a position perpendicular to the main body for example permit the lengthening or shortening of the crosspiece ensemble in order to follow the lengthening or shortening of the fuselage section lower panel. Then, the longitudinal rail which is supported by the crosspiece is no longer subjected to the distortions of the fuselage section lower panel.

Advantageously, the main body is fitted at one first end with the double pivot articulation while the other end is fitted with a pivot linkage.

In some fuselage sections, and particularly at the level of the center wing box, the floor structure is vertically separated from the fuselage section lower panel. In other words, there is a certain height between the fuselage panel and the floor structure. Height in this description means the vertical distance from the floor structure. It is also necessary to use vertical linkages, such as vertical rods, to fasten the floor structure to the fuselage lower panel. In the invention, according to needs, at least one longitudinal rail is designed to be attached to a crosspiece by means of a vertical rod. The vertical rod can then be mounted swiveling on the crosspiece around a transversal axis.

Preferably, at least one longitudinal rail is fixed to a strengthening beam along which it is laid.

BRIEF DESCRIPTION OF THE DRAWINGS

The invention shall be better understood after reading the following description and examining the accompanying figures. These are presented as illustration and in no way limit the scope of the invention. The figures show.

DETAILED DESCRIPTION OF THE DRAWINGS

Figure 1:
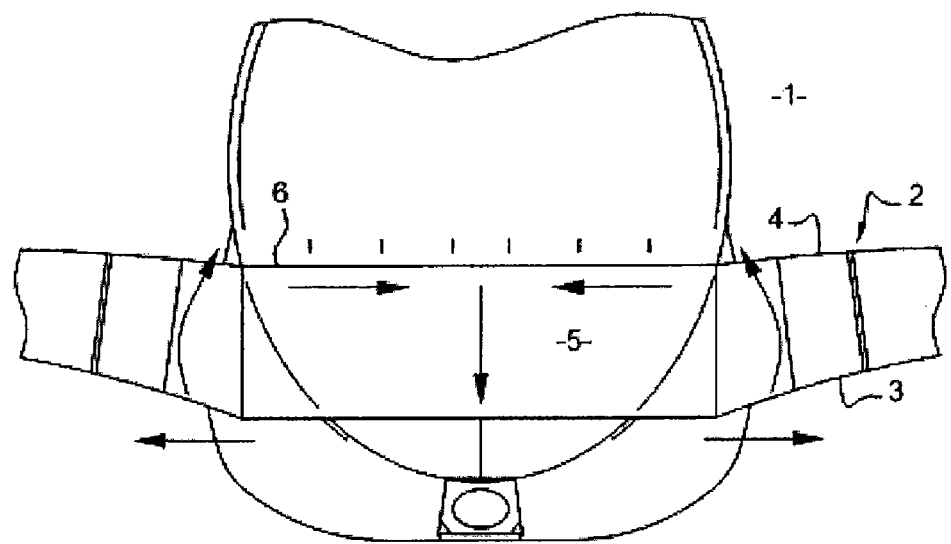
FIG. 1 is a schematic cross section of a fuselage section at the level of the center wing box, already described.
Figure 2:
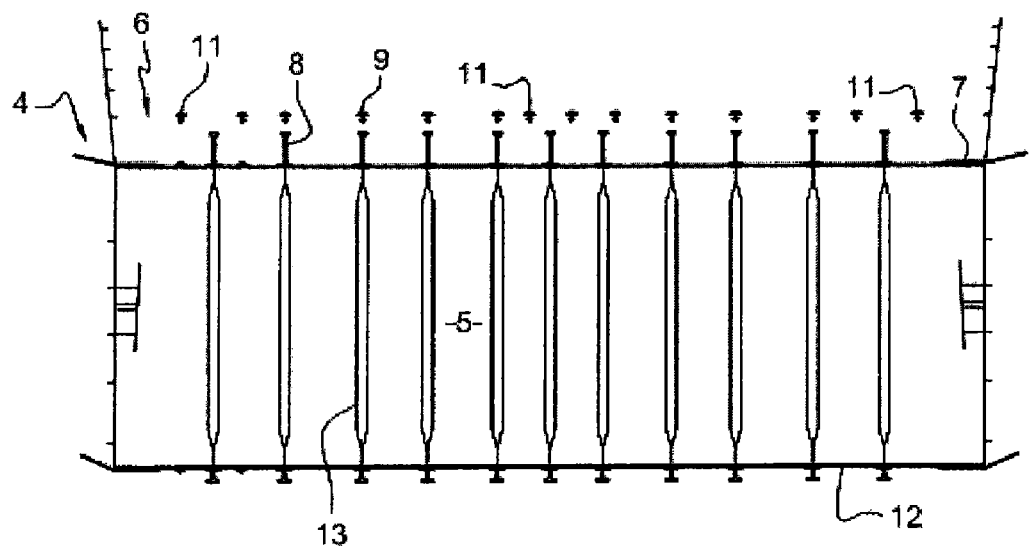
FIGS. 2 and 3 are schematic cross sections of a state of the art center wing box, already described.
Figure 3:
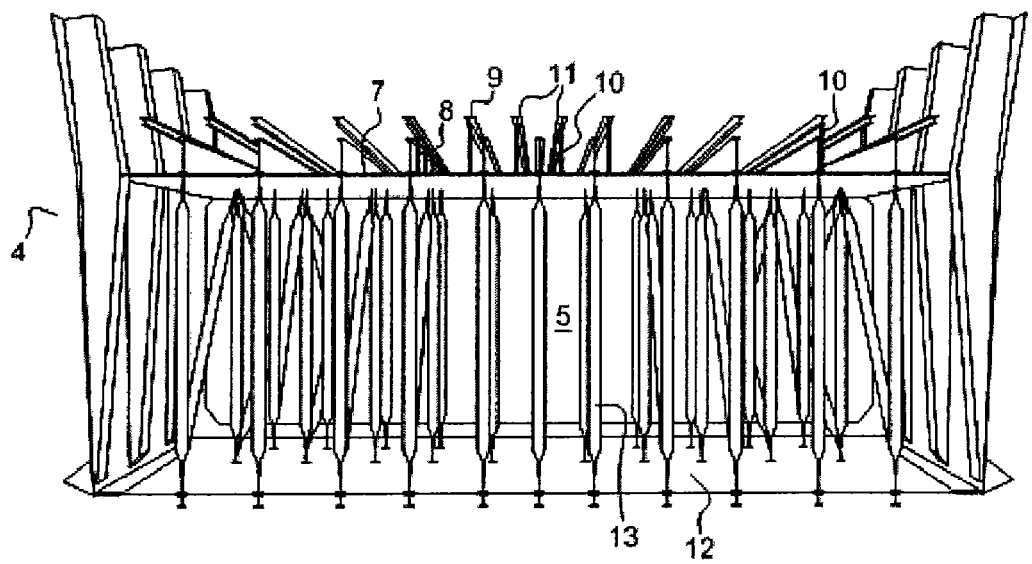
Figure 4:
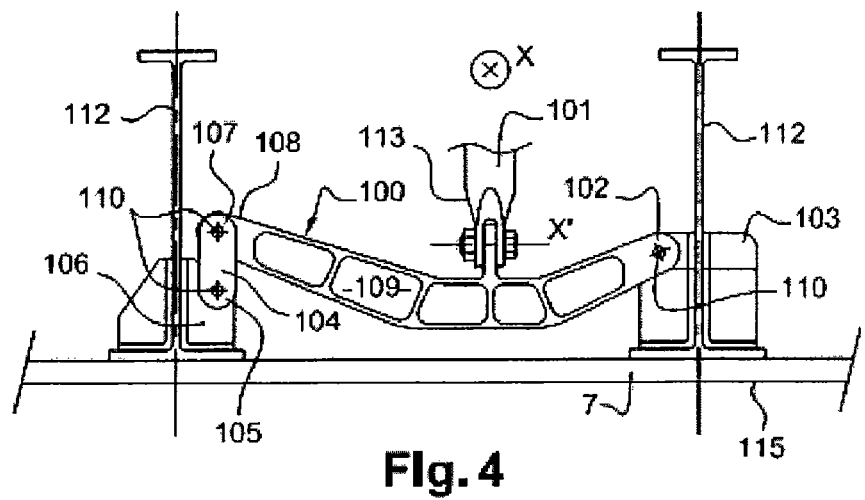
FIG. 4 is a schematic representation of a crosspiece according to the invention.

FIG. 4 shows a crosspiece 100 according to an embodiment of the invention, said crosspiece 100 being designed to support a longitudinal rail (not shown) by means of a vertical rod 101. The crosspiece 100 is in two parts, the main body 109 and the articulation 104. The main body 109 and the articulation 104 are linked to each other by a pivot linkage 110 allowing the articulation 104 to swivel from being aligned with the main body 109 to being perpendicular to the said main body 109.

The crosspiece 100 is placed transversally between two longitudinal beams 112 attached to the fuselage lower panel 7. One first end 102 of the crosspiece 100 main body 109 is mounted on a pivot 103 which is fixed on one of the two longitudinal beams 112. One first end 105 of the articulation 104 is mounted on a pivot 106 attached to the second longitudinal beam 112. The second end 107 of the articulation 104 is mounted on the second end 108 of the main body 109 of the crosspiece 100.

The three pivot linkages 110 of the crosspiece 100 are understood to enable their rotation around the longitudinal axis X of the fuselage section in which the crosspiece 100 is installed. Thus, when the fuselage section lower panel 7, which can for example be the upper panel of the center wing box of an aircraft, is shortened under the stress caused by the distortion of the wings, the articulation 104 swivels in such a way that it becomes somewhat perpendicular to the main body 109 of the crosspiece 100. When the lower panel 7 is at rest or when it is lengthened, the articulation 104 swivels towards the pivot 106 in order to increase the overall length of the crosspiece 100.

Figure 5:
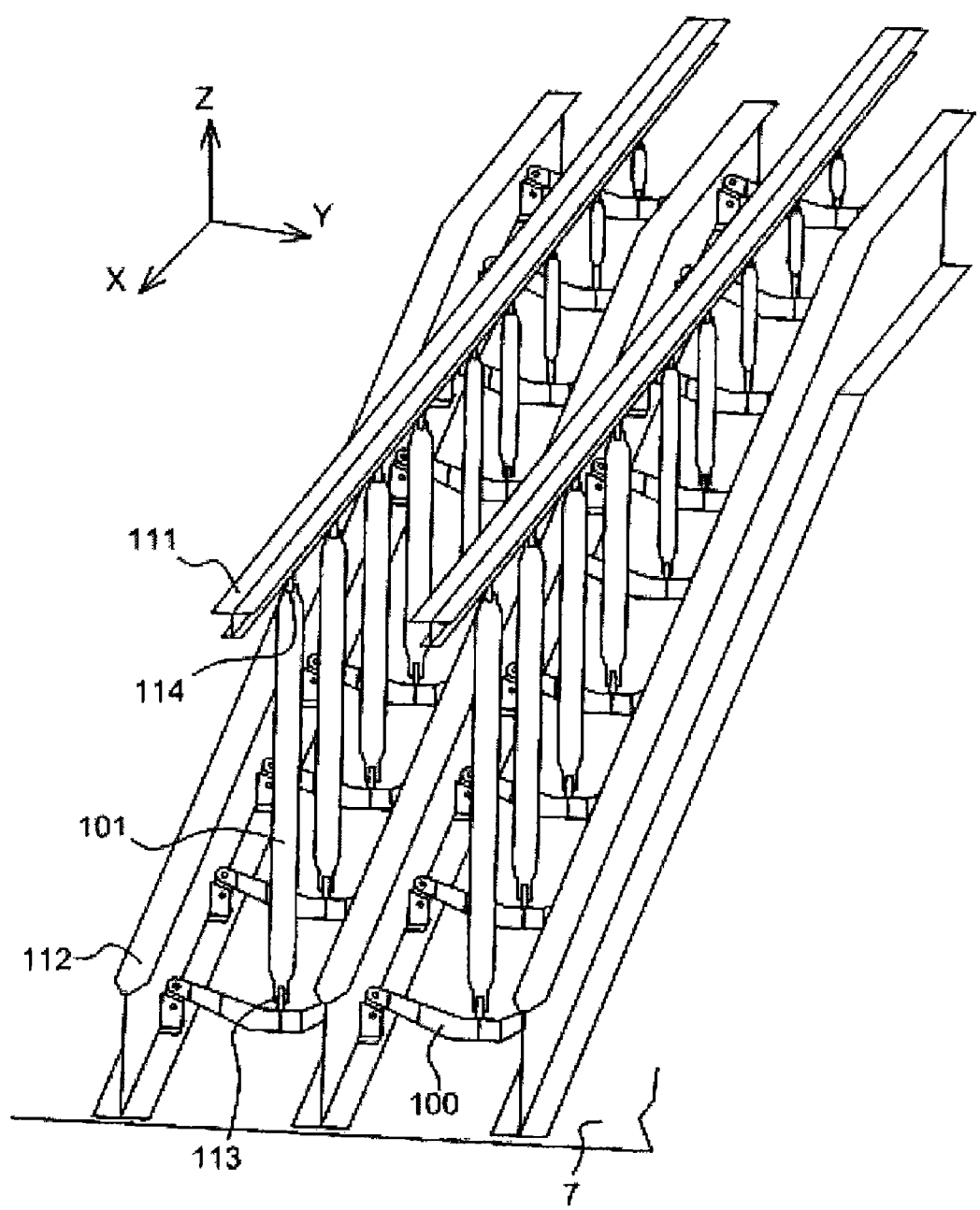
FIG. 5 is a partial schematic representation of a floor structure according to the invention.

Thus, the longitudinal rails 111 supported by the crosspieces 100, as shown in FIG. 5, are not rigidly linked to the fuselage section lower panel 7.

In addition, as shown in FIGS. 4 and 5, the longitudinal rails 111 are linked to the crosspieces 100 by means of vertical rods 101, each vertical rod 101 being placed between a crosspiece 100 and a longitudinal rail 111. More precisely, one lower end 113 is mounted on a pivot on the main body 109 of the crosspiece 100, whereas the upper end 114 is mounted on a pivot on the longitudinal rail 111. The rotation of the vertical rod 101 relative to the longitudinal rail 111 and the crosspiece 100 takes place around a transversal axis Y perpendicular to the fuselage section longitudinal axis X. Thus the longitudinal rails 111 can tilt towards the front or towards the rear of the fuselage section, front and rear being understood by reference to the direction of flight of the aircraft in which the fuselage section according to the invention is located.

As shown in FIG. 5, the longitudinal rails 111 are attached to a series of crosspieces 100 placed one behind the other. The longitudinal rails 111 are placed between the longitudinal beams and not laid on those.

In the embodiment shown in FIGS. 4 and 5, each crosspiece 100 is attached to two pivots 103 affixed to the longitudinal beams 112. It is of course possible to attach all or part of the crosspieces 100 directly on the lower panel 7.

In another embodiment, the strengthening beams 112 are fixed on the lower face 115 of the lower panel 7 in order to locate them in the center wing box internal volume. In this case, the pivots 103 and 106 can be located in the fuselage section internal volume, the crosspieces 100 remaining attached to the said pivots 103, 106.

In the case of a fuselage section with center wing box for cargo aircraft, the floor structure according to the invention includes advantageously two longitudinal rails 111 attached to crosspieces 100 and four lateral rails, two near the left side wall and two near the right side wall of the fuselage section, supported by crosspieces 100 according to the invention. The other longitudinal rails of the floor structure are fixed on the longitudinal strengthening beams.

The invention claimed is:

1. Aircraft fuselage section comprising:
a number of longitudinal strengthening beams attached to a fuselage section lower panel and a number of longitudinal rails designed to support floor boards, in which at least one crosspiece is laid transversally between at least two strengthening beams of said number of longitudinal beams and supports at least one longitudinal rail of said number of longitudinal rails, said at least one crosspiece being mounted swiveling on the fuselage section lower panel in order to permit the rotation of the at least one crosspiece around a longitudinal axis; wherein the at least one crosspiece comprises a double pivot articulation comprised of a first pivot and a second pivot, the first pivot being attached to a crosspiece main body of said at least one crosspiece and the second pivot being attached to the fuselage section lower panel; in which a first end of the crosspiece main body is fitted with the double pivot articulation and a second end of said main body is fitted with a pivot linkage.

2. Aircraft fuselage section according to claim 1, in which the at least one crosspiece comprises a plurality of crosspiece, which are laid in series between the at least two strengthening beams; wherein said at least one longitudinal rail is located longitudinally between the at least two strengthening beams and being supported by a series of said plurality of crosspieces.

3. Aircraft fuselage section according to claim 1, in which said at least one longitudinal rail is linked to the at least one crosspiece by means of a vertical rod.

4. Aircraft fuselage section according to claim 3, in which the vertical rod is mounted on a pivot on the crosspiece in order to permit rotation of the vertical rod around a transversal axis relative to the aircraft; where the pivot is located at a point distinct from the double articulation and the crosspiece pivot linkage and distinct from the first and second end of the crosspiece main body.

5. Aircraft fuselage section according to claim 1, in which said at least one longitudinal rail is fixed on one of the two strengthening beams along which the at least one longitudinal rail is laid.

6. Aircraft fuselage section according to claim 1, comprising a center wing box, of which the lower panel is an upper panel of said aircraft wing box.

\* \* \* \* \*